United States Patent
Branson et al.

(10) Patent No.: US 9,338,229 B2
(45) Date of Patent: May 10, 2016

(54) RELOCATING AN APPLICATION FROM A DEVICE TO A SERVER

(71) Applicant: International Business Machines Corporation, Armonk, NY (US)

(72) Inventors: Michael J. Branson, Rochester, MN (US); Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 13/927,190

(22) Filed: Jun. 26, 2013

(65) Prior Publication Data

US 2015/0007046 A1    Jan. 1, 2015

(51) Int. Cl.
G06F 15/16    (2006.01)
H04L 29/08    (2006.01)

(52) U.S. Cl.
CPC ............. H04L 67/1025 (2013.01); H04L 67/34 (2013.01)

(58) Field of Classification Search
CPC ...... H04L 67/10; H04L 67/34; H04L 67/1025
USPC .......... 709/202–205, 217–219, 223; 715/748; 717/174, 177
See application file for complete search history.

(56) References Cited

U.S. PATENT DOCUMENTS

| 7,454,458 | B2* | 11/2008 | Islam ....................... G06F 9/505 709/203 |
| 8,381,040 | B2* | 2/2013 | Almog ................ G06F 11/3688 712/226 |
| 8,533,714 | B2* | 9/2013 | Lorenc ................ G06F 9/45558 709/223 |
| 2002/0169878 | A1* | 11/2002 | Orenshteyn ........... G06F 9/5055 709/219 |
| 2006/0168107 | A1* | 7/2006 | Balan ...................... G06F 9/505 709/218 |
| 2010/0235829 | A1* | 9/2010 | Shukla .................... H04L 67/34 717/177 |
| 2011/0197132 | A1 | 8/2011 | Escoda et al. |
| 2011/0302194 | A1 | 12/2011 | Gonzalez et al. |

OTHER PUBLICATIONS

Aepona, "Enterprise Collaboration & the Mobile Cloud," Aepona Blog, Posted Dec. 21, 2010, Printed Feb. 20, 2013. www.aepona.com/enterprise-collaboration-the-mobile-cloud/.

Anonymous, "Location Cloud Based Information Sharing," IP.com Prior Art Database, IP.com No. IPCOM000215129D, Published Feb. 21, 2012.

Calore, M., "Google Launches Web Store for Cloud-Based Apps", Webmonkey, Posted Mar. 10, 2010, Printed Feb. 20, 2013, Wired.com © 2013 Conde Nast. www.webmonkey.com/2010/03/google-launches-web-store-for-cloud-based-apps/.

(Continued)

*Primary Examiner* — Bharat N Barot (74) *Attorney, Agent, or Firm* — Richard A. Wilhelm; Grant Johnson (57) ABSTRACT

Methods are provided for transferring an application to a virtual electronic device. One method may include receiving an application to be relocated from a first local electronic device to a virtual electronic device. The method may further include, establishing a first anchor between the first local electronic device and the relocated application. The first anchor may be adapted to act as a conduit between the first local electronic device and the application. The method may further include, requesting local application data from the first local electronic device via the first anchor in response to an interrupt from the application on the virtual electronic device.

14 Claims, 7 Drawing Sheets

(56) References Cited

OTHER PUBLICATIONS

Chaiken et al., "Creating Distributed Document Folders in a Collaborative Viewing Session", IP.com Prior Art Database, IP.com No. IPCOM000116408D, Electronic Publication Mar. 30, 2005, (Original Publication: IBM TDB, vol. 38, No. 9, pp. 189-190, Sep. 1, 1995).

IBM, "Method of creating a componentized architecture for unifying resource sharing scenarios in cloud computing environment", IP.com Prior Art Database, IP.com No. IPCOM000193146D, Published Feb. 11, 2010.

Raphael, "Amazon Cloud Drive: 3 things to consider before you commit", Computer World.com, Posted Mar. 30, 2011, Printed Feb. 20, 2013, © 1994-2013 ComputerWorld.com. blogs.computerworld.com/18056/amazon_cloud_drive.

Gogobeans, © 2011 Gogobeans, Inc., http://www.gogobeans.com/welcome.php/features-2/.

Contributors: 16@r, 2001:1838:2001:6:91C1:BA41:C5:217D, Anshuln95, et al., "Virtualization," http://en.wikipedia.org/w/index.php?oldid=559467407, Creative Commons Attribution-Share Alike 3.0 Unported//creativecommons.org/licenses/by-sa/3.0/.

Contributors: 42U, ABF, Abelson, et al., "Virtual Network Computing", http://en.wikipedia.org/w/index.php?oldid=556884734, Creative Commons Attribution-Share Alike 3.0 Unported//creativecommons.org/licenses/by-sa/3.0/.

Mell, P. et al., "The NIST Definition of Cloud Computing," Version 15, Oct. 7, 2009, National Institute of Standards and Technology, Information Technology Laboratory, http://csrc.nist.gov/groups/SNS/cloud-computing/index.html.

\* cited by examiner

RELOCATING AN APPLICATION FROM A DEVICE TO A SERVER

TECHNICAL FIELD

This disclosure generally relates to relocating an application, and in particular, to a method of transferring an application to a virtual-based environment.

BACKGROUND

Virtual machines may help to more efficiently use physical processing resources by allowing one computer system to support functions normally performed by multiple separate computer systems. By virtualizing a server environment in a cloud-based network, a single physical resource may support multiple virtual machines in a flexible manner that provides improved utilization of the processing resource. Further, if a physical processing resource in a cloud-based network becomes over-utilized, virtual machines may migrate to other physical processing resources of the cloud-based network that may have processing capacity.

In parallel, pervasive devices have become part of everyday life. While their main purpose is to enable voice communication, new features are transforming cell phones into multipurpose devices. With every new feature, dependence on pervasive devices increases. In particular special purpose applications have become popular for such devices.

SUMMARY

In one embodiment, a method is provided for transferring an application to a virtual electronic device. The method may include receiving an application to be relocated from a first local electronic device to a virtual electronic device. The method may further include, establishing a first anchor between the first local electronic device and the relocated application. The first anchor may be adapted to act as a conduit between the first local electronic device and the application. The method may further include, requesting local application data from the first local electronic device via the first anchor in response to an interrupt from the application on the virtual electronic device.

In another embodiment, a method is provided for transferring an application to a virtual electronic device. The method may include relocating an application from a first local electronic device to a virtual electronic device. The method may further include, establishing a first anchor between the first local electronic device and the relocated application. The first anchor may be adapted to act as a conduit between the first local electronic device and the relocated application. The method may further include the receiving of a request for application data from the relocated application via the first anchor. The method may further include the transmitting application data responsive to the request to the relocated application via the first anchor.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

Embodiments of the present disclosure provide a method and computer program product for relocating application from a local electronic device (LED) to a virtualization-based resource while running and maintaining current settings and data using an anchor. In various embodiments, the anchor may include a proxy for the LED, a proxy for the virtualization-based resource, and secure connection between the proxies. Anchors are discussed in more detail below. Embodiments may further provide for collaboration by one or multiple users of the application while executing in the virtualization-based environment (VBE). Some embodiments may also reduce demand for resources on the remote devices with the application relocated.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud computing model generally includes at least five characteristics, at least three service models, and at least four deployment models.

The five characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is generally service oriented, with a focus on statelessness, low coupling, modularity, and semantic interoperability. At the heart of cloud computing is an infrastructure comprising a network of interconnected nodes.

Figure 1:
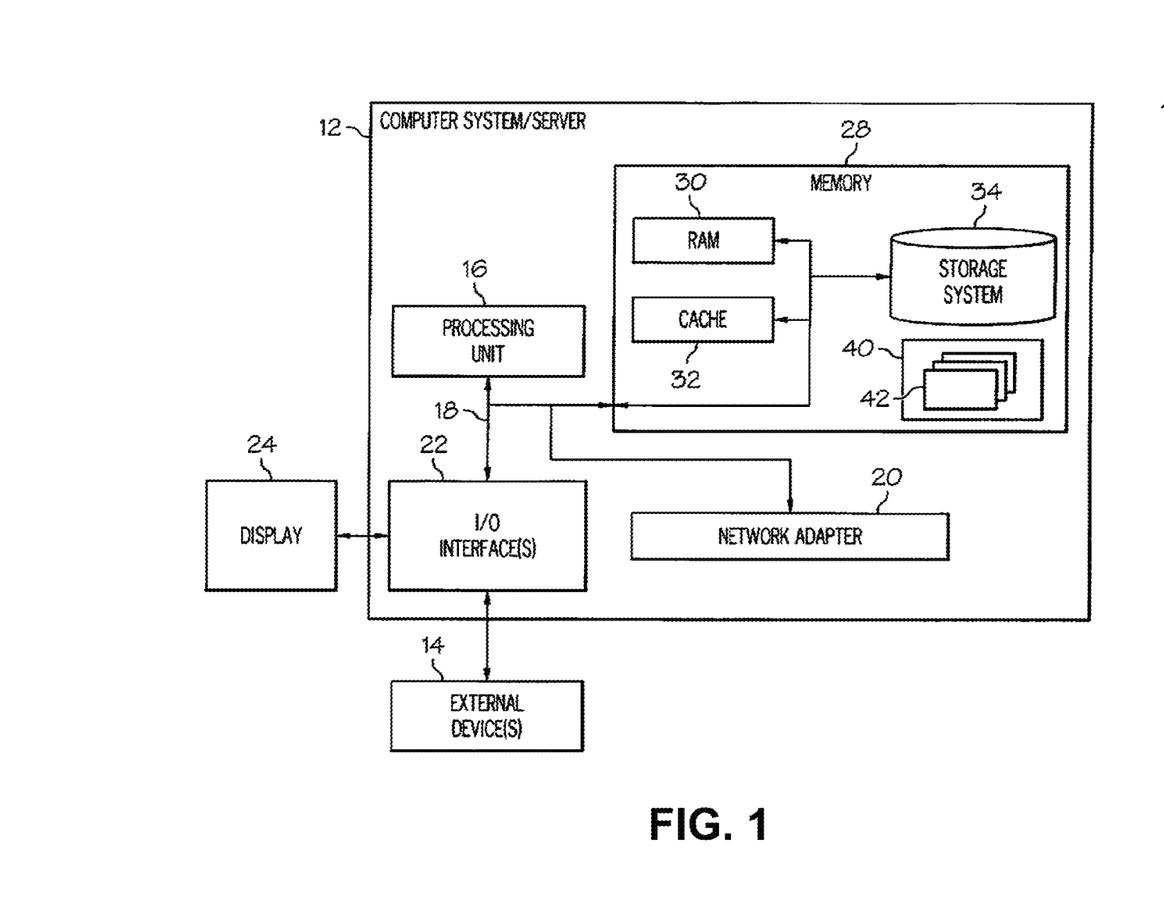
FIG. 1 depicts a cloud computing node, according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
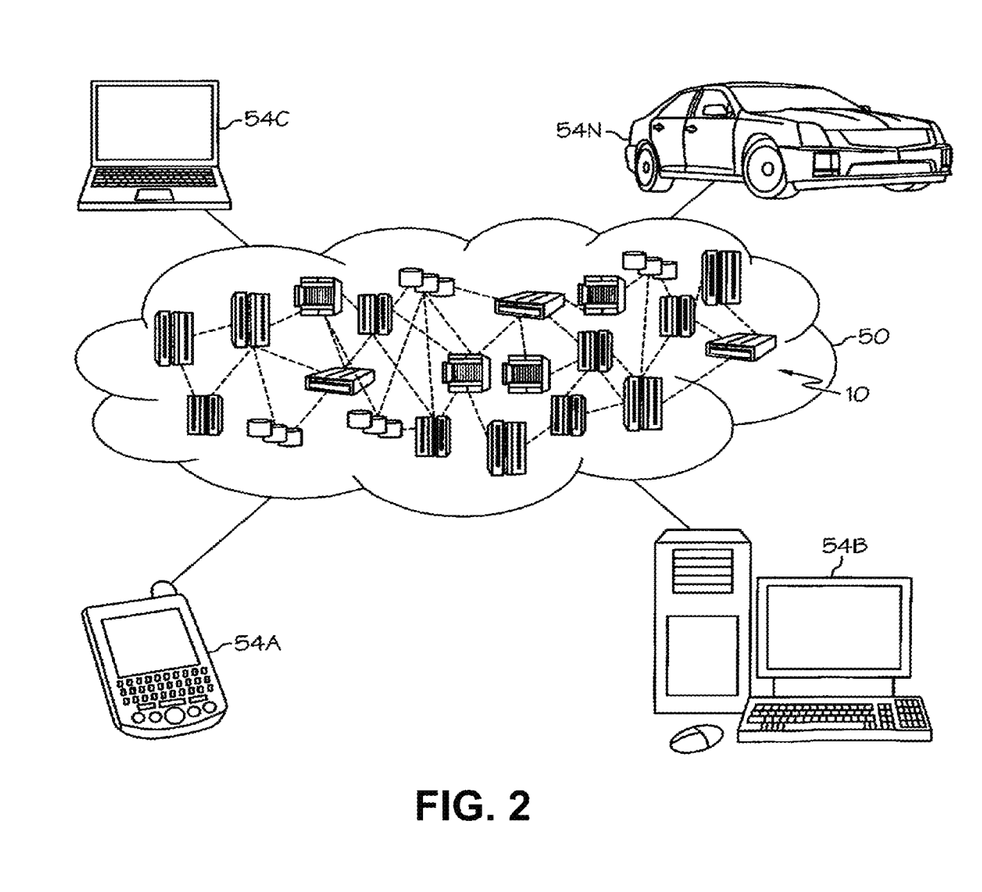
FIG. 2 depicts a cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices 54 used by cloud consumers, such as, for example, personal digital assistant (PDA) or cellular telephone 54A, desktop computer 54B, laptop computer 54C, and/or automobile computer system 54N may communicate. In various embodiments, the local computing devices 54 may be LEDs. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device 54. It is understood that the types of local computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
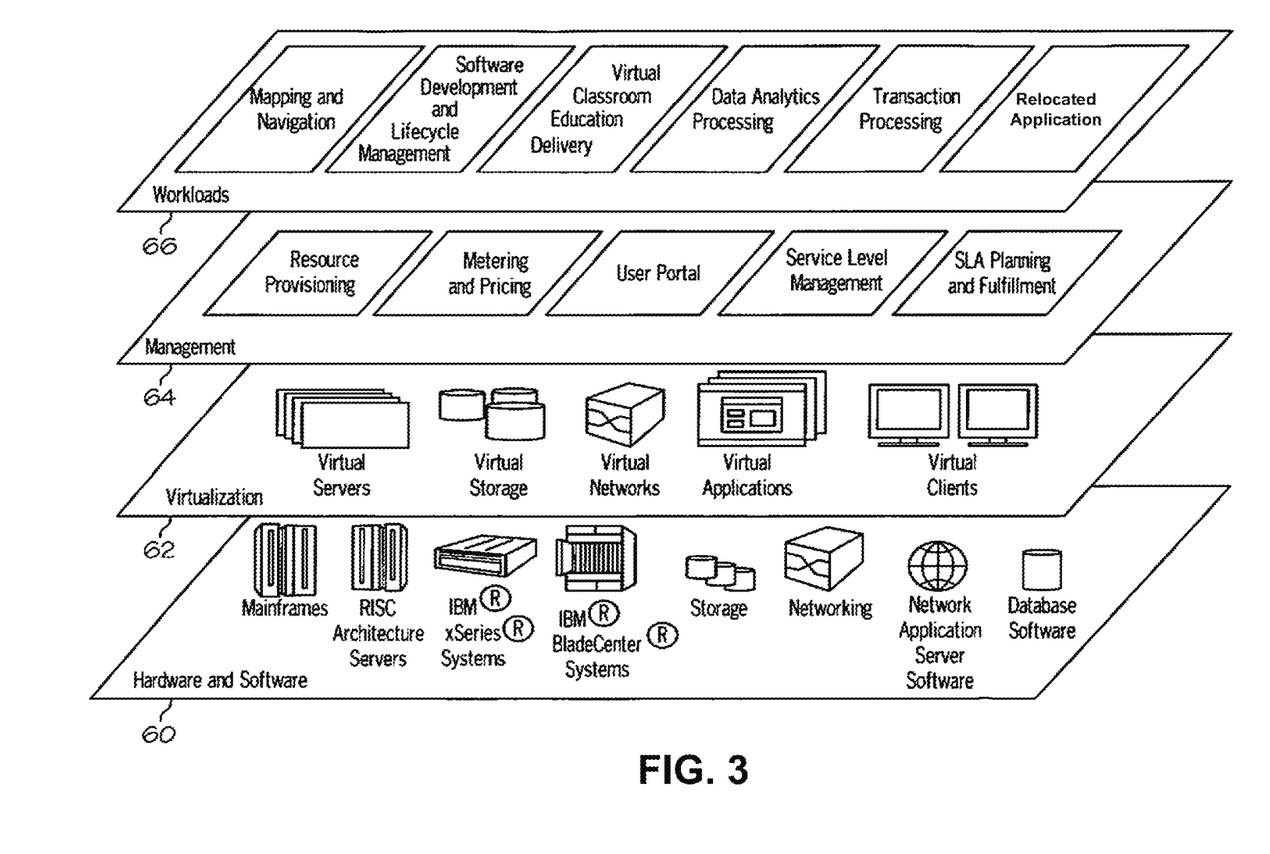
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment may provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and an application relocated from a remote device.

Figure 4:
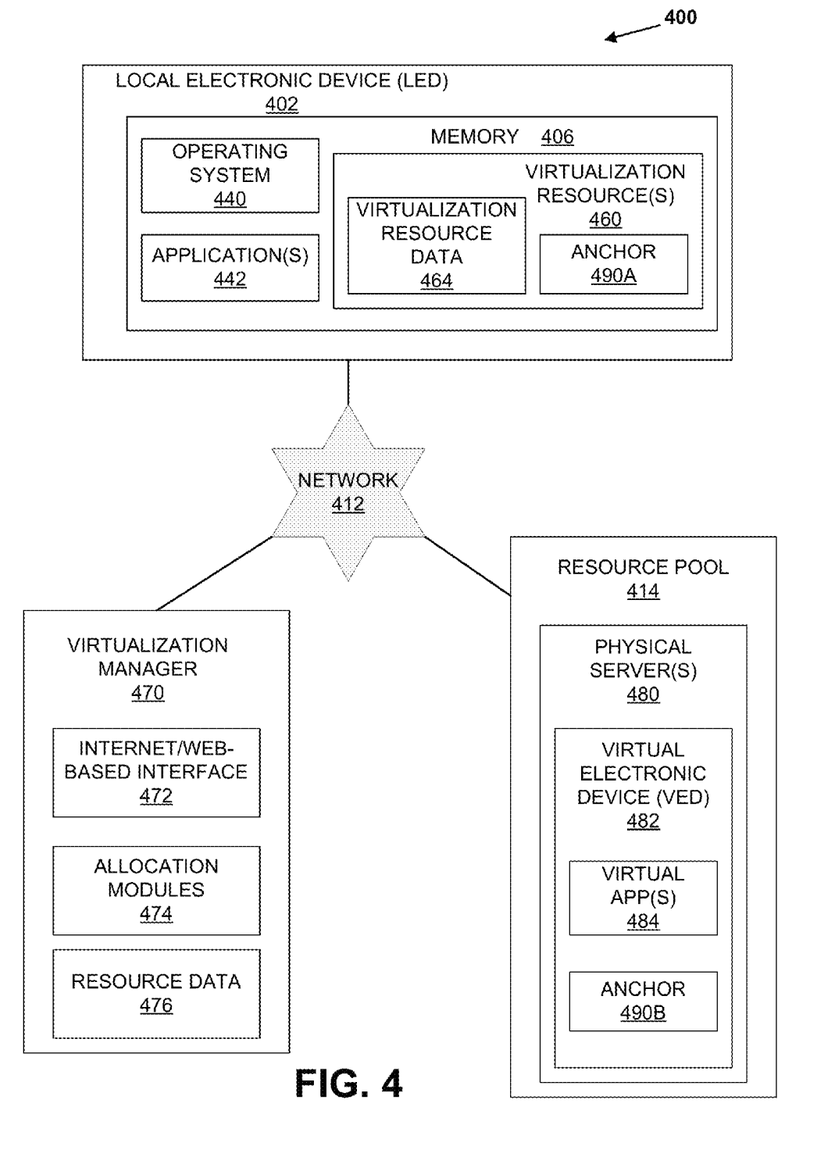
FIG. 4 depicts a virtualization based system 400 for utilizing virtualization based resources, according to an embodiment of the present invention.

FIG. 4 is an illustrative embodiment of a virtualization based system 400 for utilizing virtualization based resources in a cloud or other type of computing environment to relocate an application for use by a remote electronic device (RED). The illustrated embodiment, system 400 includes the LED 402, a virtualization manager 470, and a resource pool 414, connected with each other by a network 412.

In operation, the combination of LED 402, virtualization manager 470, resource pool 414, all connected with network 412 may be used to relocate an application 442 from the LED 402 to a VED 482. An anchor 490, in turn, allows the relocated application, now a virtual application 484, to be unaware of this relocation. This may have the benefit of the virtual application 484 being able to use the resources of the LED 402 without special permission or modification.

System 400 may be implemented on data processing systems or platforms such as, but not limited to, node 10 or at other data processing system locations. System 400 (e.g., all or portions thereof) may be implemented, for example, on hardware and software layer 60 and/or on management layer 64 as depicted in FIG. 3. The LED 402 in this embodiment may be a computer, laptop, tablet, mobile phone, or other electronic device capable of running or using applications. In various embodiments, LED 402 may include one or more processors capable of reading and executing instructions and/or running a variety of types of applications. In various embodiments, such as the illustrated embodiment, the LED 402 may include a memory 406. In the illustrated embodiment, the memory contains operating system 440, application(s) 442, and virtualization resource(s) 460.

The virtualization resource(s) 460 may include information associated with various virtualization-based resources located in the resource pool 414 that may be provisioned or allocated by or for the LED 402. For example, virtualization resources data 464 may include information associated with various other types of virtualization-based resources available from resource pool 414 that may be provisioned or allocated to LED 402. The virtualization resource data may also include a first part of anchor 490A that is connected with a second part of anchor 490B in the resource pool 414. The first part of the anchor 490A may include the device proxy previously mentioned, and the second part of the anchor 490B may include the virtualization-based resource proxy. The anchor 490 is discussed in further detail below.

In the illustrated embodiment, the LED 402 is connected to the resource pool 414 and the virtualization manager 470 over a network 412. The resource pool 414 may include a variety of types of computing resources such as, but not limited to, servers, storage resources, memory resources, processing power resources, networking resources and virtual machines. A virtual machine is a virtual sharing or partition of computer resources. For example, the virtually partitioned resources may include one or more processors, memory, storage, network cards, etc. Each virtual machine may run its own instance of an operating system and may run one or more applications with its operating system.

In FIG. 4, system 400 includes a virtualization manager 470. Virtualization manager 470 may include an internet-based or web-based interface 472 accessible by LED 402 via the network 412 for identifying or provisioning various virtualization-based resources. In the illustrated embodiment, virtualization manager 470 may include one or more processor units and a memory (not shown). The memory may contain, for example, allocation modules 474 and resource data 476. The virtualization manager 470, may control, oversee, or allow the use of the resource pool 414 by the LED 402. In various embodiments, the virtualization manager 470 may be part of, split between, or separate from the LED 402 or resource pool 414. In various embodiments, the virtualization resource data 464 may include communication information, controls or instructions for, or allocation information from or about the virtualization manager 470.

In the illustrated embodiment, the resource pool 414 may include a physical server 480 containing a plurality of virtual electronic devices (VED) 482 (only one shown for clarity). Each VED 482 may, in turn, contain one or more virtual applications 484 and the second part of anchor 490B that is connected with the first part of anchor 490A in the virtualization resource(s) 460 on the LED 402. The virtual application 484 and the anchor 490 are discussed below. In various embodiments, the second part of anchor 490B may reside in virtual application 484, LED 482 or in another part of the resource pool 414. It should be understood that resource pool 414, virtualization manager 470, and LED 402 may include additional elements not shown in various embodiments or that some elements shown may be more numerous or absent. For example, the resource pool 414 may contain storage resources.

Figure 5:
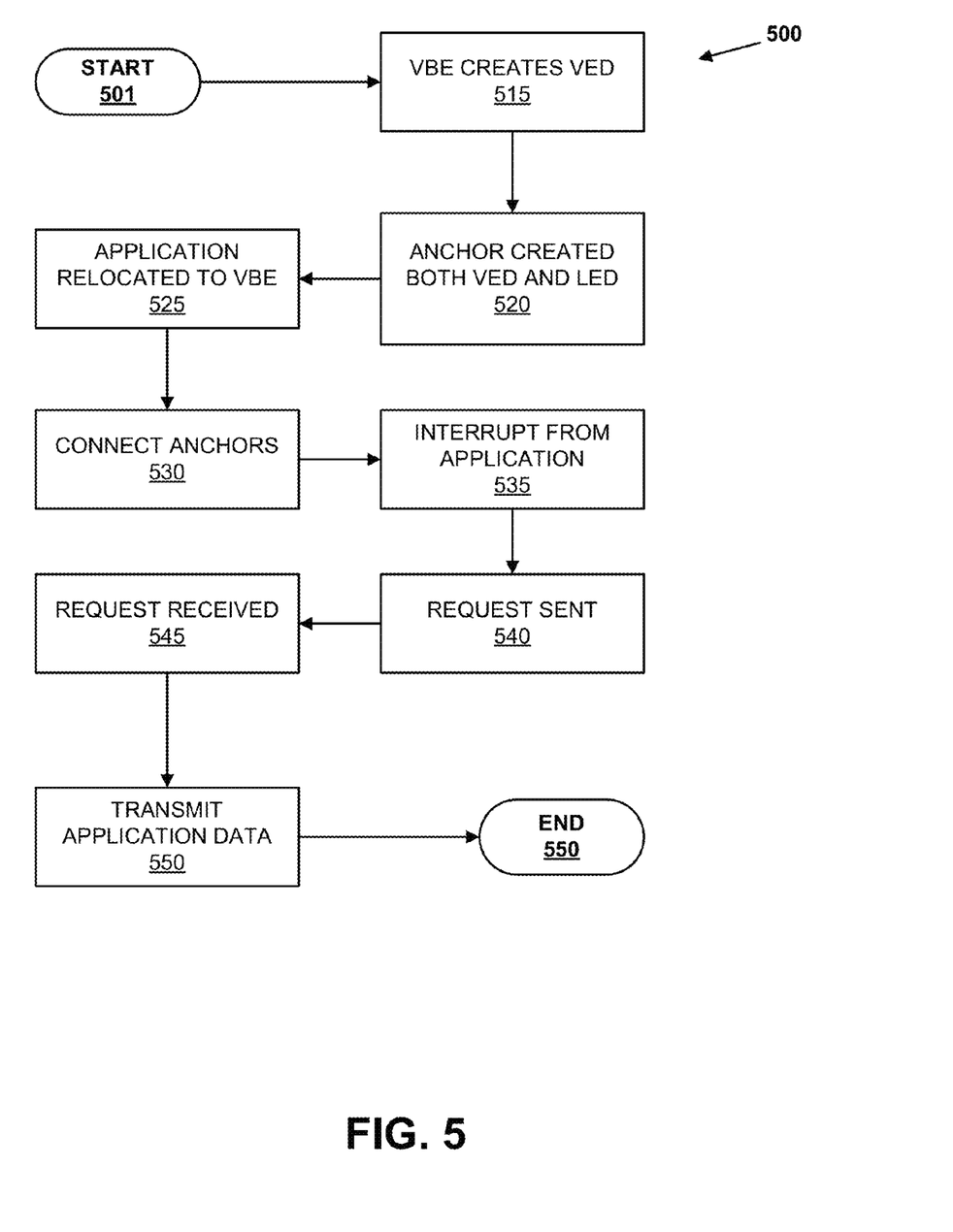
FIG. 5 is a flowchart illustrating a method 500 that may be used to move an application from a local electronic device to a virtualization-based environment, according to an embodiment of the invention.

FIG. 5 is a flowchart illustrating a method 500 that may be used to move an application from a remote device to a virtualization-based environment (VBE), according to an embodiment of the invention. The method may start at block 501. In block 515, the virtualization manager 470 of the VBE creates the VED 482 by assigning resources from the resource pool 414. The VED 482 may be considered the VBE created for the purpose of housing the virtual application 484. The VED 482 may be based off the LED 402 currently running the application 442 that is to be moved to the VBE. That is, the VED 482 includes virtual replicas of all process, inputs, or outputs the LED 402 may use or have available. The VED 482 may be created when the request to move the application 442 to the VBE occurs, or it may be preexisting and available upon request by the LED 402 or user. In various embodiments, the VBE may be created or managed by the virtualization manager 470.

In block 520, the anchor 490 may be created. The first part of anchor 490A may be located in the LED 402, and the second part of anchor 490B may be in the VED 482. The anchor 490 may act as a conduit between the LED 402 and the virtual application 484. The anchor may, for example, be used to communicate local application data, user input(s), or application output between the LED 402 and VED 482. Local application data may include, but is not limited to, data the application may need from the LED 402 and devices connected to it. Application output may include output data that would be used by the LED 402, user, or devices connected to or in communication with the LED 402. Local application data is discussed below. In various embodiments, the user input may be referred to as interactive user input, or input that comes from a user at the LED 402. In various embodiments, the anchor 490 may be a technology that enables the virtual application 484 to access the LED 402 resources or data without the virtual application 484 knowing where the virtual application 484 is being run.

In various embodiments, the anchor 490 may include the proxy for the virtualization-based resource, the proxy for the LED 402, a private data memory store, and an API mapper. When the anchor 490 is created, it attaches the virtual application 484 to the LED 402. Since all local application data may be still on the LED 402, the anchor 490 may include a secure connection between the VED 482 and the LED 402 so that the private data, which may be form of local application data, can be put into memory inside the VED 482 without it being available for other applications in the virtualization-based resource. The memory used for the private data may be part of the memory allocated to VED 482 from the resource pool 414, or memory allocated to the anchor 490 from the VED 482. The anchor may include a device access API mapper. The device access API mapper may allow communication or coordination between the LED 402 and VED 482 in both directions so that the LED 402 may render the UI of virtual application 484, and may also allow the VED 482 or virtual application 484 to access local application data from resources such as, but not limited to, a mobile phone, a camera, and input devices on or in communication with the LED 402. The device access API mapper may, in various embodiments, exist independently, simultaneously, or partially in one or more of the virtualization resources 460, the VED 482, or the anchor 490. With the use of the anchor 490 the virtual application 484 may not need to know it is being run on a specific device, such as the LED 402, or in the VBE. For example, the anchor 490 may be a conduit or proxy for the LED 402 so when the virtual application 484 wants to access the location services or capabilities of the LED 402, such as a GPS system, the anchor 490 may be the conduit through which the virtual application 484 may get that information.

In various embodiments, the anchor 490 may include connection information such as, but not limited to, unique phone identifiers such as MAC or UID or mobile compute cloud identifiers used by the virtualization pool 470 or resource pool 414. in various embodiments, the anchor may use standard internet protocol, such as TCP/IP as a connectivity path. In various embodiments, the anchor 490 may perform as proxies for the LED 402 so anchor 490 may pass detailed hardware API requests and returns between the LED 402 and the virtual application 484. This may be so the virtual application 484 does not have to be aware it is in a VED 482. The anchor 490 may not need knowledge of each API, rather it may just be a conduit from the virtual application 484 to the hardware. For example, the anchor 490 and the VED 482 may simulate the hardware of the LED 402 to the virtual application 484, and simulate the virtual application 484 to the hardware of the LED 402. In various embodiments, the anchor 490 may between two different VED 482. For example, a second VED 482 may be created on a PC or in the cloud as a simulator for testing.

In block 525, the application 442 may be relocated to the VBE and transformed into virtual application 484. The relocation of the application 442 is described in further detail below in FIG. 6. In block 530, the first part of anchor 490A in the LED 402 and second part of anchor 490B in the VED 482 are connected. In various embodiments, the creation and connection of the anchor 490 in block 530 may be considered part of moving the application 442 to the VBE in block 525. In other embodiments, the creation and connection of the anchor 490 may occur in parallel or intermixed with steps of relocating the application 442 in block 525.

With the anchor 490 created and connected in block 535 an interrupt from the virtual application 484 may occur. The interrupt may, in some embodiments, be a requirement for, request for, or query about local application data. In block 540, a request for local application data may be made to the LED 402 via the anchor 490 in response to the interrupt. In block 545, the request may be received by the LED 402 via the anchor 490. Because of the anchor, the LED 402 may treat the request as if the virtual application 484 were still on the LED (e.g. It was still application 442). In block 550, the LED 402 transmitting the requested local application data back to the virtual application 484 via the anchor 490. The method may end in block 450.

With the anchor in place, transmission and requests for data such as local application data, application information, or application outputs are intercepted and transferred between the LED 402 and the VED 482 when they occur. For example, if the user inputs information into the LED 402 for the virtual application 402, such as a query, this local application data, here the application input, is replicated in the VED 482 through the anchor 490. In some embodiments, this may provide the virtual application 484 in the VBE, or VED 482, access to all information, data, inputs, or output devices available to the LED 402. For example, when the above query was inputted and transferred to the virtual application 484, it may use the anchor 490 to collect local application data from the LED 402 that the virtual application 484 would have gathered had it resided in the LED 402. If the query was for directions, for example, the virtual application 484 will use the anchor 490 to access the GPS capabilities of the LED 402 for a current location of the LED 402 so that direction may be provided. In other embodiments, if the virtual-based environment is shared by more than one user the additional anchors 490 may be created when the application is relocated so that the application is available to all users of the virtual-based environment.

Figure 6:
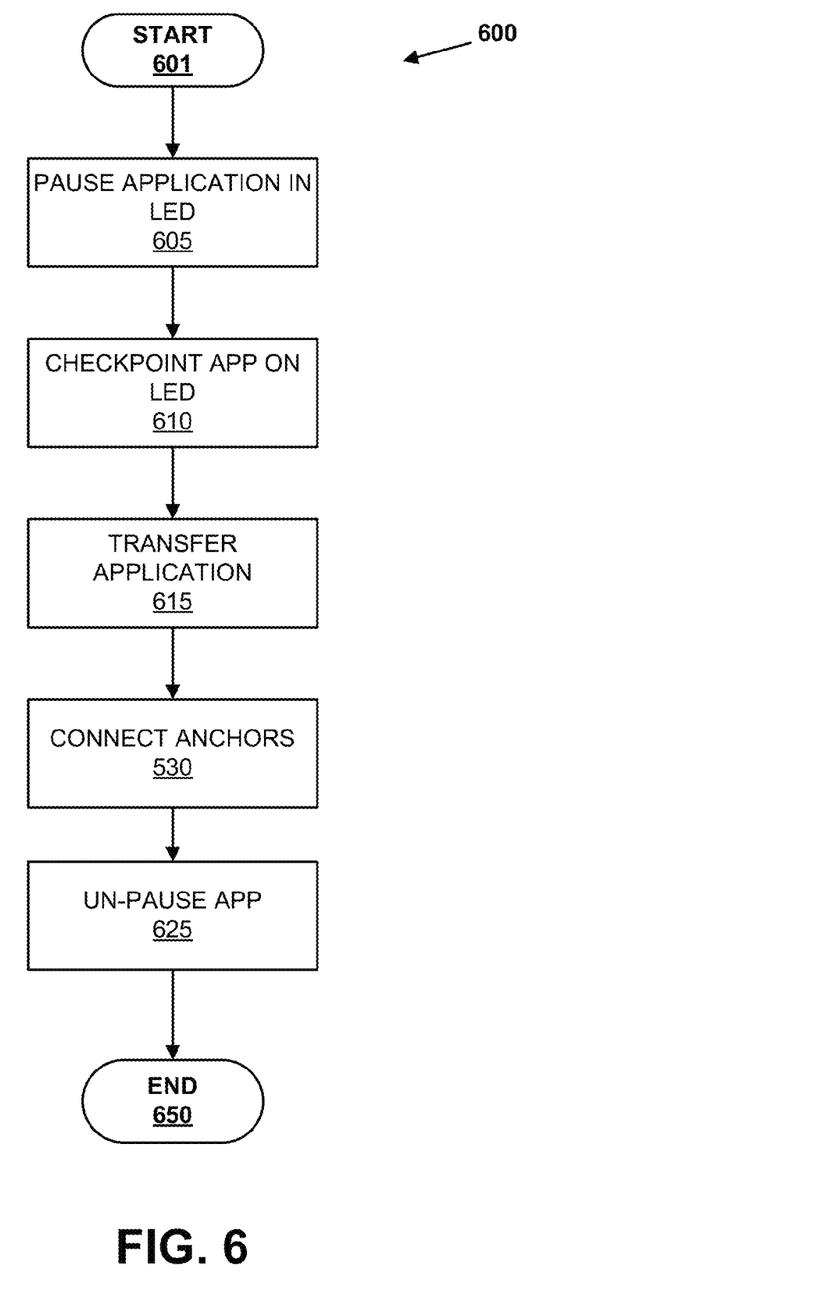
FIG. 6 is a flowchart illustrating a method 600 that may allow the application to be moved to the virtualization-based environment in block 525 of FIG. 5, according to an embodiment of the invention.

FIG. 6 is a flowchart illustrating a method 600 that may allow the application 442 to be moved to the VBE in block 525 of FIG. 5, according to an embodiment of the invention. The method may start at block 601. In block 605, the application 442 in the LED 402 may be paused. With the application 442 paused the application 442 may be checkpointed in block 610. In various embodiments, the checkpointing of the application may include creating checkpoint data by determining all processes, inputs, and outputs the application was currently working on or had queued, or stored in memory, and recording the values, location, progress of each in the checkpoint data. The checkpoint data may include various metadata or data from the created by or for the application in memory of the LED 402.

In block 615, the application may be relocated, or transferred, to the VED 482 and become the virtual application 484 referred to in block 525. In various embodiments, this may occur by copying or transferring the application in the LED 402 to the VED 482. In other embodiments, the virtual application may be installed or created in the VED 482. The virtual application 484, which may be paused, may be primed, with the checkpoint data gathered from the application 442 and transferred from to the VED 482. In various embodiments, the checkpoint data may be transferred when the program itself is relocated to the VED 482. In other embodiments, the transferring of the checkpoint data may be a separate event or step. In various embodiments, priming may involve inputting, transferring, updating, or Qing the virtual application 484 with the checkpoint data. Once primed with the checkpoint data the virtual application 448 will be at the same state or progress in processes as the application 442 was prior to relocation at the point of pausing in block 605. In the illustrated embodiment, block 530 where the first part of anchor 490A in the LED 402 and second part of anchor 490B in the VED 482 may be connected at this point. In block 625, the virtual application may be un-paused and the user may proceed with any tasks that the application 442 had been processing. With the checkpoints and the anchors in place the virtual application 484 may have no knowledge that it is relocated copy of the application 442 or remote of the LED 402. The method may end in block 650.

In various embodiments, access to the virtual application 484 may be shared with one or more additional LEDs 402 upon relocation to the VBE. This may include application output(s), ability to input data, or queries of the application in use. In various embodiments this may include the creation of additional anchors 490 between the virtual application 484 and the additional LED 402. In such embodiments, the virtual application 484 may have a first anchor coupled to the first LED 402 and a second anchor coupled to the second LED. The new second anchor may act and have the same capabilities of the first anchor previously discussed and may be created or set-up the same way.

Figure 7:
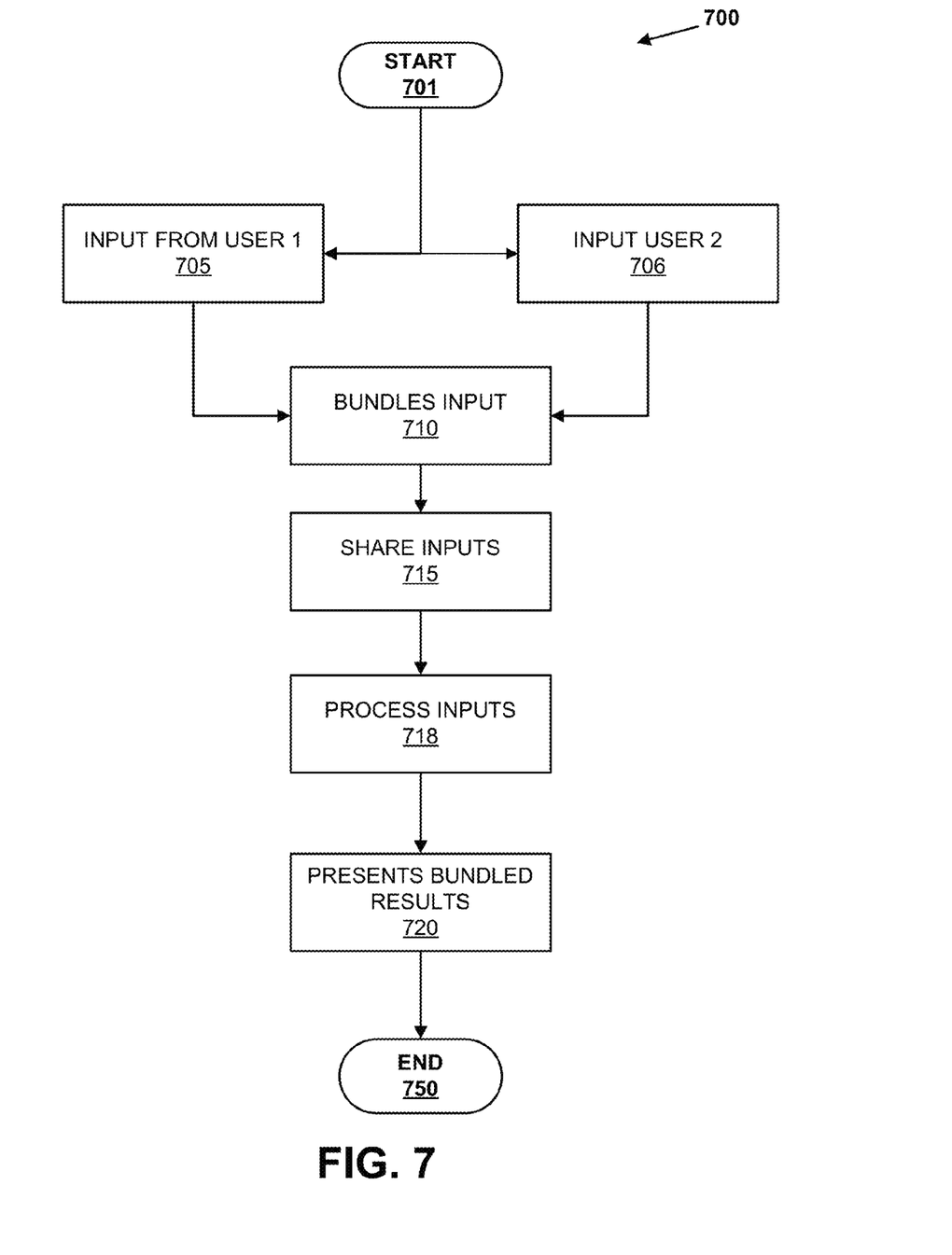
FIG. 7 is a flowchart illustrating a method 700 for managing the use of the virtual application by multiple users or local electronic devices, according to an embodiment of the invention.

When a virtual application 484 has multiple anchors 490 or users the virtual application 484 may have one or more methods for managing the inputs, processes, and outputs of the virtual application 484. FIG. 7 is a flowchart illustrating a method 700 for managing the use of the virtual application 484 by multiple users or LEDs 402, according to an embodiment of the invention. The method may start in block 701. In block 705 a first input from user 1 may be received by the virtual application 484 through the first anchor. At the same time in block 706, a second input from user 2 may be received by the virtual application 484 through the second anchor. The virtual application 484 may bundle the first and second inputs in block 710. In operation, bundling may be done so that multiple inputs from multiple users may be resolved. In various embodiments, resolving the bundled inputs may include viewing, evaluating, comparing, or organizing the inputs by the system for processing in the VED 482. In various embodiments, bundling or resolving may include also include combining, running in parallel, prioritizing, or sharing the input between the two users. In block 710, the inputs of one user are shared with the other user. The application may have a special field or application output for the shared input. For example, the user interface display may have a box or section dedicated to the other user's activity. In block 718, the bundled inputs are processed by the virtual application 484. In block 720 the result of the bundled inputs are shared or presented to both users. The method may end in block 750.

In some embodiments, the bundling or processing may involve the use of prioritization based upon a metric. Some examples of such metrics may be, but are not limited to, a first input to arrive at the virtual application 484, a user ranking, an input term size, historical data such as previous result quality of user inputs, a priority of inputting LED 402 based upon originator of application 442 prior to relocation, or a defined role for the user. For example, the virtual application may always give preference in bundled inputs to the user 1 based upon a user ranking metric. In another example, the virtual application may give preference to user 2 inputs based upon user 2 having a history of generating better, higher rated, or more commonly selected search results.

In other embodiments, the application outputs for each user input may be shown to both users and they may be allowed to proceed with their own application output result(s), the result(s) of other users, or proceed independent of either result(s). For example, the virtual application 484 may be used for finding restaurants. User 1 may input the term "hamburgers" while the user 2 may input the term "sushi". The virtual application 484 may decide the terms are incompatible and present user 1 and 2 with the result of each others searches. The users may proceed with those results for more information or may try another independent search outside of the provided results. In some embodiments, the inputs from each user may be cooperatively used or combined to provide application output to the users. In another example where the virtual application 484 may be used for finding restaurants, user 1 may input the term "hamburgers" while the user 2 may input the term "sports bar". In this example, the virtual application 484 will decide that these terms are compatible and combine the inputs from both users may be combined to show results of sports bars that server or specialize in hamburgers using a mechanism such as a web search engine.

In still other embodiments, the interactive user input from one user may be required to be approved by the other user. This may, in some embodiments, be based upon activities of the other user. For example, the virtual application 484 receives an input, such as a commit button request, from user 1. If no interaction is happening with user 2 the input is processed. However, if interaction is happening with user 2, both users see that interaction is taking place and user 2 must also click OK for the input of user 1 to be processed.

The above embodiments and examples of managing inputs from multiple users are not meant to be limiting. A variety of methods for managing inputs and usage of a virtual application are contemplated and considered in the scope of the invention.

Exemplary embodiments have been described in the context of a fully functional system for relocating an application from a local electronic device to a virtualization-based environment and managing the inputs from and outputs to one or more local electronic devices once relocated. Readers of skill in the art will recognize, however, that embodiments also may include a computer program product disposed upon computer-readable storage medium or media (or machine-readable storage medium or media) for use with any suitable data processing system or storage system. The computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer or storage system having suitable programming means will be capable of executing the steps of a method disclosed herein as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the claims.

As will be appreciated by one skilled in the art, aspects may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used. The computer readable medium may be a computer-readable signal medium or a computer-readable storage medium. The computer readable signal medium or a computer readable storage medium may be a non-transitory medium in an embodiment. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, or on one module or on two or more modules of a storage system. The program code may execute partly on a user's computer or one module and partly on a remote computer or another module, or entirely on the remote computer or server or other module. In the latter scenario, the remote computer other module may be connected to the user's computer through any type of network, including a local area network (LAN) or a wide area network (WAN), or the connection may be made to an external computer (for example, through the Internet using an Internet Service Provider).

Aspects are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart, or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions or acts specified in the flowchart, or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terms "server and "mobile client" are used herein for convenience only, and in various embodiments a computer system that operates as a mobile client computer in one environment may operate as a server computer in another environment, and vice versa. The mechanisms and apparatus of embodiments of the present invention apply equally to any appropriate computing system, including a computer system that does not employ the mobile client-server model.

While this disclosure has described the details of various embodiments shown in the drawings, these details are not intended to limit the scope of the invention as claimed in the appended claims.

What is claimed is:

1. A computer-implemented method, comprising:
   establishing a first anchor between a first local electronic device and a server computer,
      wherein an anchor is adapted to act as a conduit between a local electronic device and an application that has been relocated to a server computer from the local electronic device, each anchor including a first proxy for the application at the local electronic device, a second proxy for a virtualization-based resource at the server computer, and an application program interface mapper;
   receiving a first application and check point data for the first application from the first local electronic device via the first anchor by the server computer, wherein the first application is running on the first local electronic device prior to receiving the first application and the checkpoint data is determined prior to receiving the first application, the check point data including data of a state of the application; and
   subsequent to receiving the first application and check point data:
      receiving a first user input from the first local electronic device via the first anchor by the server computer,
      processing the first user input by the first application at the server computer,
      generating a first output based on processing the first input, and
      transferring the first output from the server computer to the first local electronic device via the first anchor.

2. The method of claim 1, further comprising:
   receiving local application data for the first application from the first local electronic device via the first anchor;
   wherein the processing of the first user input by the first application at the server computer includes processing the local application data; and
   generating a second output based on processing the first input and the local application data.

3. The method of claim 1, further comprising, subsequent to receiving the first application and check point data:
   establishing a second anchor between a second local electronic device and the server computer, the second anchor adapted to act as a conduit between the second local electronic device and the first application; and
   transferring the first output from the server computer to the second local electronic device via the second anchor.

4. The method of claim 1, further comprising, subsequent to receiving the first application and check point data:
   establishing a second anchor between a second local electronic device and the server computer, the second anchor adapted to act as a conduit between the second local electronic device and the first application;

receiving a second user input from the second local electronic device via the second anchor by the server computer;

combining the first and second user inputs into a bundle of inputs;

wherein the processing of the first user input by the first application at the server computer includes processing the bundle of inputs;

generating a second output based on processing the bundle of inputs; and transferring the second output from the server computer to the first local electronic device via the first anchor and to the second local electronic device via the second anchor.

5. The method of claim 4, wherein the first and second user inputs are first and second search parameters of a search query and the second output is a search result that matches both the first and second search parameters.

6. The method of claim 4, wherein the combining the first and second user inputs into a bundle of inputs further comprises:

requesting an approval from the first local electronic device to process of the second user input prior to combining the first and second user inputs into a bundle of inputs.

7. The method of claim 1, wherein the first local electronic device comprises a cellular telephone.

8. A computer-implemented method, comprising:

establishing a first anchor between a first local electronic device and a server computer, wherein an anchor is adapted to act as a conduit between a local electronic device and an application that has been relocated to a server computer from the local electronic device, each anchor including a first proxy for the application at the local electronic device, a second proxy for a virtualization-based resource at the server computer, and an application program interface mapper;

transferring a first application and check point data for the first application from the first local electronic device via the first anchor to the server computer, wherein the first application is running on the first local electronic device prior to receiving the first application and the checkpoint data is determined prior to receiving the first application, the check point data including data of a state of the application; and subsequent to transferring the first application and check point data:

transmitting a first user input from the first local electronic device via the first anchor to the server computer, and receiving a first output from the server computer at the first local electronic device via the first anchor, the first output being a result of a processing of the first input by the first application at the server computer.

9. The method of claim 8, further comprising:

transmitting local application data for the first application from the first local electronic device to the server computer via the first anchor; and receiving a second output from the server computer at the first local electronic device via the first anchor, the second output being a result of a processing the first input and the local application data.

10. The method of claim 8, further comprising, subsequent to transferring the first application and check point data:

establishing a second anchor between a second local electronic device and the server computer, the second anchor adapted to act as a conduit between the second local electronic device and the first application; and receiving the first output from the server computer at the second local electronic device via the second anchor.

11. The method of claim 8, further comprising, subsequent to transferring the first application and check point data:

establishing a second anchor between a second local electronic device and the server computer, the second anchor adapted to act as a conduit between the second local electronic device and the first application;

transmitting a second user input from the second local electronic device via the second anchor to the server computer; and transferring a second output from the server computer to the first local electronic device via the first anchor and to the second local electronic device via the second anchor, wherein the second output is based on combining the first and second user inputs into a bundle of inputs and processing the bundle of inputs.

12. The method of claim 11, wherein the first and second user inputs are first and second search parameters of a search query and the second output is a search result that matches both the first and second search parameters.

13. The method of claim 11, further comprising:

receiving a request for an approval from the server computer to process the second user input by the first local electronic device; and transmitting an approval by the first local electronic device.

14. The method of claim 8, wherein the first local electronic device comprises a cellular telephone.

* * * * *